(12) United States Patent
Ebert

(10) Patent No.: US 11,602,968 B2
(45) Date of Patent: Mar. 14, 2023

(54) VEHICLE RIGID AXLE AND METHOD OF MANUFACTURING SAME

(71) Applicant: Ebert-Consulting GmbH, Cologne (DE)

(72) Inventor: Jorg Ebert, Cologne (DE)

(73) Assignee: Ebert-Consulting GmbH, Cologne (DE)

( * ) Notice: Subject to any disclaimer, the term of this patent is extended or adjusted under 35 U.S.C. 154(b) by 0 days.

(21) Appl. No.: 17/840,504

(22) Filed: Jun. 14, 2022

(65) Prior Publication Data

US 2022/0402322 A1 Dec. 22, 2022

(30) Foreign Application Priority Data

Jun. 16, 2021 (DE) .......................... 102021115615.7

(51) Int. Cl.
*B60G 9/00* (2006.01)

(52) U.S. Cl.
CPC .......... *B60G 9/003* (2013.01); *B60G 2200/31* (2013.01); *B60G 2202/152* (2013.01); *B60G 2206/012* (2013.01); *B60G 2206/8201* (2013.01)

(58) Field of Classification Search
CPC .... B60G 9/003; B60G 11/28; B60G 2200/31; B60G 2206/424; B60G 2206/30; B60G 2204/4306; B60G 2204/148; B60B 35/007

See application file for complete search history.

(56) References Cited

U.S. PATENT DOCUMENTS 2,204,287 A * 6/1940 Wilber .................. B21K 23/04
74/607
3,015,238 A * 1/1962 Williams ............. B60G 17/005
301/137

(Continued)

FOREIGN PATENT DOCUMENTS

DE 10120742 10/2002
DE 102013009188 12/2014

(Continued)

OTHER PUBLICATIONS

German Search Report, in counterpart application No. 10 2021 115 615.7, dated Feb. 7, 2022, 5 pages.

(Continued)

*Primary Examiner* — Faye M Fleming
(74) *Attorney, Agent, or Firm* — Fattibene and Fattibene, LLC; Paul A. Fattibene

(57) ABSTRACT

A vehicle rigid axle with an axle beam, at the ends of which axle journals or wheel carriers, respectively, are arranged, and with at least two trailing arms rigidly attached to the axle beam and with at least one air spring bellows assigned to the respective trailing arm. At least one component of an electric drive is placed in the hollow body, the drive shaft of which passes through the axle journal. To form at least one axle journal connection section extending between the two trailing arms, a trailing arm connected thereto and a receptacle for at least one component of an electric drive, two shell elements are formed from sheet metal and connected to one another, in particular welded, to form a hollow body surrounding the receiving space. At least one component of the electric drive is mounted in the receiving space.

14 Claims, 5 Drawing Sheets

(56) References Cited

U.S. PATENT DOCUMENTS

| | | | |
|---|---|---|---|
| 6,749,209 B2* | 6/2004 | Davison | B60B 35/08 |
| | | | 280/124.109 |
| 7,025,428 B2* | 4/2006 | Gabella | B60G 17/005 |
| | | | 280/124.17 |
| 7,370,872 B2* | 5/2008 | Abrat | B60B 35/04 |
| | | | 280/124.157 |
| 10,518,627 B2* | 12/2019 | Nagpal | B60K 7/0007 |
| 10,562,349 B2* | 2/2020 | Nagel | B60G 11/465 |
| 2004/0188972 A1 | 9/2004 | Abrat et al. | B60G 1/00 |
| 2007/0199763 A1* | 8/2007 | Henze | B60B 35/006 |
| | | | 301/124.1 |
| 2020/0130412 A1* | 4/2020 | He | B60B 35/122 |
| 2020/0247184 A1 | 8/2020 | Ebert | B60B 35/007 |

FOREIGN PATENT DOCUMENTS

| | | | | |
|---|---|---|---|---|
| DE | 102019201518 | | 8/2020 | |
| EP | 1419056 | | 5/2004 | |
| JP | 2001287525 A | * | 10/2001 | ........... B60G 21/055 |
| JP | 2015020670 A | * | 2/2015 | ............ B60G 7/001 |

OTHER PUBLICATIONS

EPO Search Report dated Nov. 16, 2022 in counterpart European Patent application No. 22178981.1-1012; 7 pages.

* cited by examiner

VEHICLE RIGID AXLE AND METHOD OF MANUFACTURING SAME

FIELD OF THE INVENTION

The present invention refers to a vehicle rigid axle.

BACKGROUND OF THE INVENTION

The rigid vehicle axle proposed in DE 101 40 856 B4 has an axle beam section formed by two interconnected shell elements. A hollow body is formed between these shell elements. In the prior art, the hollow body accommodates a spring bellows for supporting the rigid vehicle axle and has a corresponding bracket in the hollow body for this purpose.

SUMMARY OF THE INVENTION

The present invention is based on the problem of specifying a rigid vehicle axle that meets the requirements of modern drive concepts.

In view of this, the present invention proposes a rigid vehicle axle with an axle beam, at the ends of which axle journals or wheel carriers, respectively, are arranged, and with at least two trailing arms rigidly attached to the axle beam and with at least one bracket assigned to the respective trailing arm. At least one air spring bellows is assigned to the respective trailing arm. At least one axle beam section extending between the two trailing arms and a trailing arm adjoining it are formed by two shell elements which are connected to one another. The two shell elements form a hollow body between them. In the hollow body at least one component of an electric drive is provided. The drive shaft of the electric drive passes through the axle journal.

The rigid vehicle axle according to the invention is designed essentially in accordance with the specification according to DE 10 2019 201 518 A1. Thus, with regard to the design, reference can essentially be made to this prior art. However, the rigid vehicle axle according to the invention does not have a spring bracket within the hollow body. Rather, the hollow body is adapted to accommodate at least one component of an electric drive, which is arranged inside the hollow body and connected to the hollow body.

In this case, at least the output shaft of the electric drive is usually coaxial with the axle journals or the wheel carriers of the rigid vehicle axle.

DE 10 2013 009 188 A1 describes the arrangement of a generator in a sleeve that is connected to an axle journal via a flange connection. This axle journal is penetrated by the drive shaft to a wheel of the vehicle rigid axle. In the prior art, this wheel drives the generator. Similar solutions are known for electric drives of semitrailers of trucks, which are driven by the electric drive. However, the flange connection is not sufficiently resistant to torsion and bending. The previously known proposals for arranging an electric drive essentially within the rigid axle of the vehicle accordingly do not meet the requirements.

This is where the present invention comes in. The two shell elements are—as described in the aforementioned prior art DE 10 2019 201 518 A1—preferably joined together by welding. This results in a dimensionally stable hollow body. It has been shown that this hollow body is quite capable of resisting the torques transmitted from the electric drive to the vehicle wheel. The hollow body is also sufficiently resistant to bending and torsion.

According to a preferred further embodiment of the present invention, the rigid vehicle axle according to the invention has an insertion opening for inserting the at least one component of the electric drive in a direction essentially at right angles to the axial extension of the drive shaft. Compared to the previously known solutions with a sleeve for inserting the electric drive, this creates an enlarged installation space that simplifies assembly. The installation space is not limited. Rather, the hollow body can be manufactured with any dimension. The stiffness provided by the hollow body in terms of deflection and torsion can be achieved by adapted selection of the wall thickness and/or by shaping the two shell elements.

Furthermore, the solution according to the invention also offers the possibility of connecting the at least one component of the electric drive to at least one of the shell elements in a simple manner, for example by screwing from the outside. Such screwing is also simplified by an insertion opening which allows insertion essentially in a direction perpendicular to the axial extension of the drive shaft.

The same applies to the mechanical damping of the at least one component of the electric drive. These components are usually the electric drive as such and possibly a transmission which is interposed between the drive shaft and the electric drive.

Rigid vehicle axles of the type mentioned above are subject to considerable mechanical stresses during operation, in particular due to vibration and impacts. These impacts not only stress the vehicle rigid axle in terms of bending and torsion. Rather, these impacts are usually passed on directly to the components mounted inside the rigid vehicle axle. However, the tolerance of components of an electric drive system to such impacts is reduced. Thus, according to a preferred further embodiment of the present invention, it is proposed to apply at least one component of the electric drive against the at least one shell element with the interposition of a mechanical damping element. The assembly is usually done by screwing the at least one component under interposition of the damping element. The damping element dampens the vibrations or impacts to which the vehicle axle is subjected to such an extent with respect to the at least one component of the electric drive that there is no risk of damage to the corresponding component as a result of the impacts.

In a manner known per se, according to a preferred further embodiment of the present invention, the rigid vehicle axle is supported by a spring bellows, in particular an air spring bellows. For this purpose, at least one of the shell elements forms a spring console for supporting the air spring bellows. The spring console can be formed in particular as a cover for the previously mentioned insertion opening. The cover may fully or partially protrude into the cavity, so that the overall height of the rigid vehicle axle is reduced compared to a chassis of a trailer.

In accordance with its subsidiary aspect, the present invention proposes a method of manufacturing a rigid vehicle axle.

This method corresponds substantially to the method described in DE 10 2019 201 518 A1. Reference may also be made to this disclosure with respect to preferred further embodiments of the rigid vehicle axle.

BRIEF DESCRIPTION OF THE DRAWINGS

Further advantages and details of the present invention result from the following description of an embodiment in connection with the drawing.

DETAILED DESCRIPTION OF THE INVENTION

Figure 1:
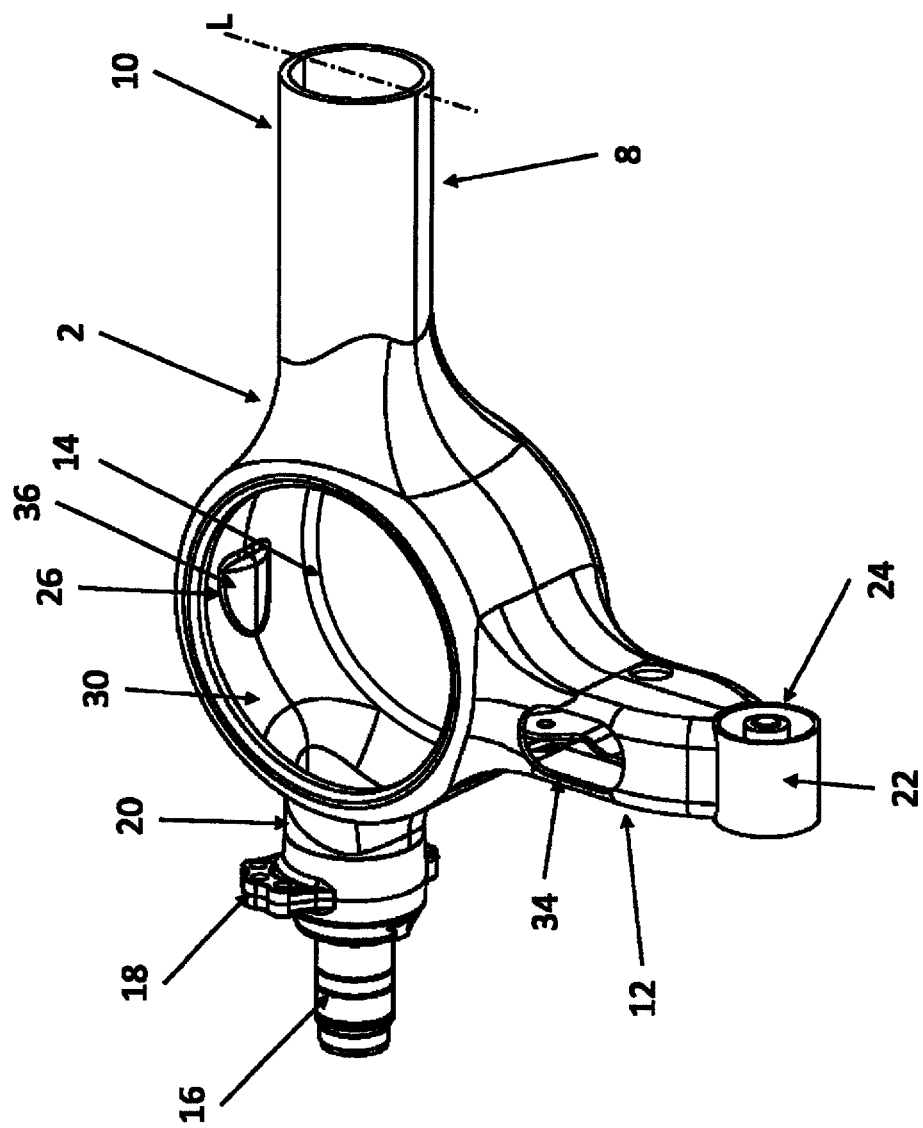
FIG. 1 shows a perspective side view of an embodiment of a vehicle rigid axle of the present invention.

The Figures show an axle beam marked with reference numeral 2, formed by joining a lower shell element 4 and an upper shell element 6. The two shell elements 4, 6 are joined together by welding to form the axle beam 2. The connecting line usually extends in the neutral fiber of a bending load on the axle beam 2.

The two shell elements 4, 6 together form an axle beam section 10, a trailing arm 12 and a bracket 14. FIG. 1 shows only half of the complete vehicle rigid axle 8. The distal end of the axle beam section 10 lies on the central longitudinal axis of the vehicle, regularly of a truck trailer. Thus, on the other side of the longitudinal axis marked L, the structure shown to the left of it in FIG. 1 is repeated.

On the side opposite the bracket 14 in relation to the axle beam section 10, an axle journal 16 is welded on, which is fitted with a conventionally shaped brake mounting flange 18. The axle journal 16 is connected by friction welding to an axle journal connection section 20, which is formed half by the lower and half by the upper shell element 4, 6.

A bearing sleeve 22 is welded to the distal end of the trailing arm 12, which accommodates further components of a normally designed joint bearing 24. Trailing arm 12 has an immersion opening 34.

Figure 2:
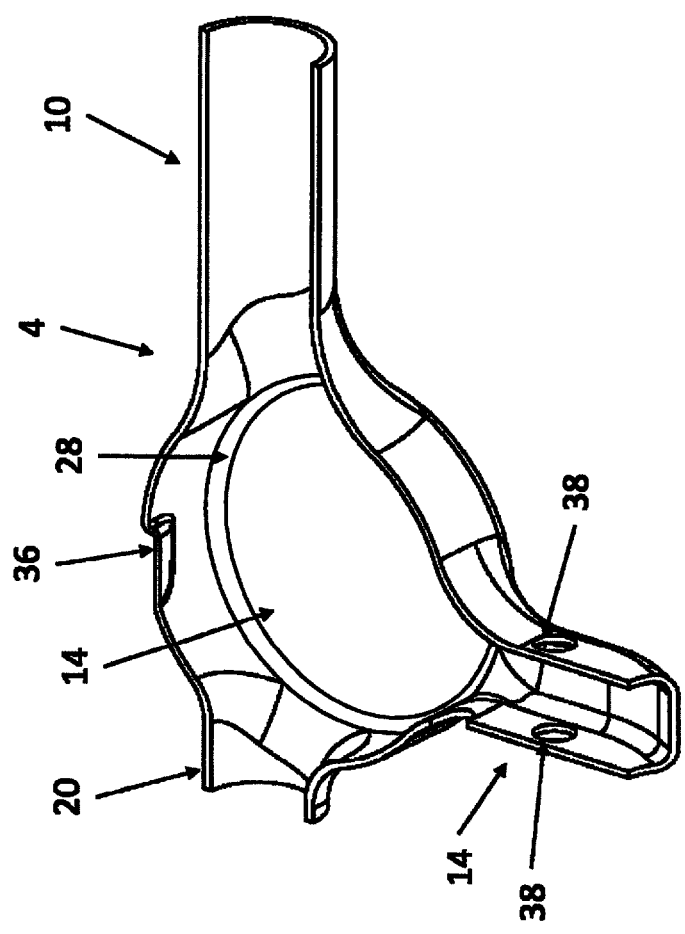
FIG. 2 shows a perspective top view of the lower shell element of the rigid axle according to FIG. 1.
Figure 3:
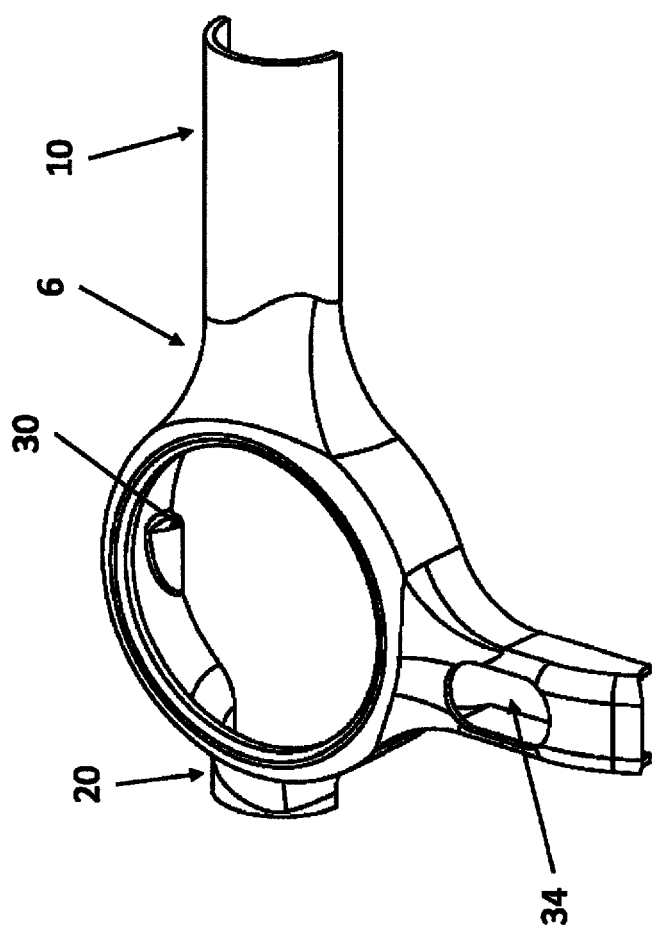
FIG. 3 shows a perspective top view of the upper shell element of the rigid axle according to FIG. 1.

As FIGS. 2 and 3 in particular illustrate, the axle beam 2 forms a hollow body marked with reference numeral 26 between the joined shell elements 4, 6, so that axle beam section 10 and axle journal connection section 20 end as hollow tubes with a circular cross-section. The trailing arm 12 is also welded to the bearing sleeve 22 as a hollow body which tapers conically at the end.

Figure 4:
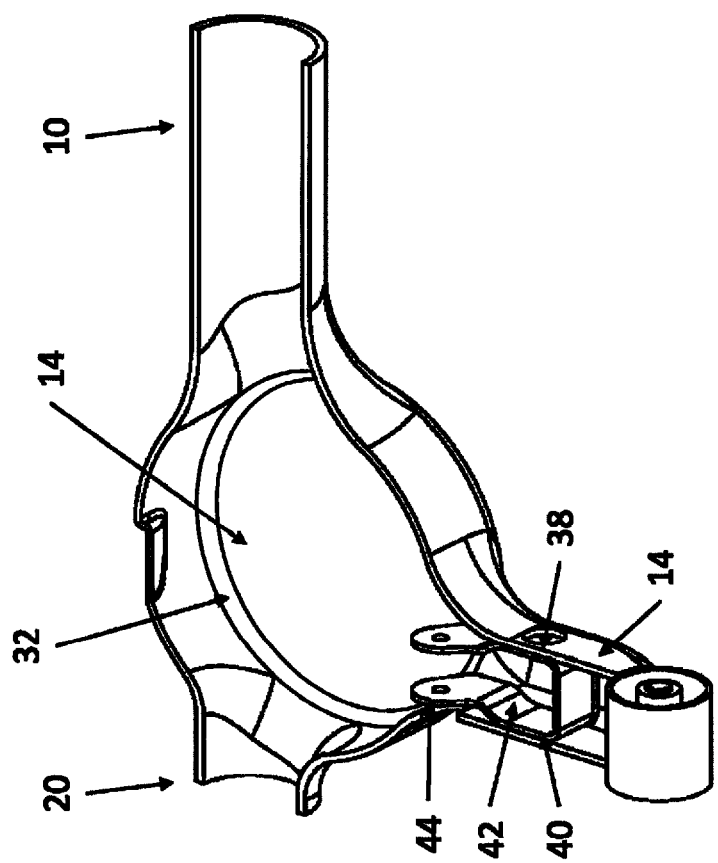
FIG. 4 shows a perspective view of the lower shell element as shown in FIG. 2 after welding on further components of the vehicle rigid axle and FIG. 5 shows a longitudinal-sectional view of the embodiment after assembly.

The deep-drawn shell elements 4 and 6 shown in FIGS. 2 and 3 can either form half the axle beam with only one trailing arm 12 and a bracket 14 and an axle journal connection section 20. Corresponding shell elements 4, 6 can, however, also be symmetrically shaped with respect to the longitudinal axis L and accordingly form an axle journal connection section 20, a trailing arm 12 adjacent to it and a bracket 14 having a fixing hole 38 assigned to the trailing arm 12. FIG. 4 shows the lower shell element with bracket 14 holding leg 42 having a bearing element 40 and bearing bore 44.

In this way, an axle beam 2 can be produced simply and economically by deep-drawing and some finishing steps explained in more detail below. The starting materials used for the manufacture of the lower and upper shell elements, i.e. the sheets to be deep-drawn, have varying wall thicknesses in order to correspond to the different stresses on axle beam 2. The trailing arm 12, for example, is regularly made of a thinner sheet material than the axle beam section 10 or the axle journal connection section 20. The different sheet thicknesses can be prepared, for example, by contour rolling (TRB—Tailor Rolled Blank) or by welding sheets with different wall thicknesses. The axle guide 12 has a wall thickness of between 2 and 4 mm less than the wall thickness of sections 10 and 20. For example, the sheet material forming the trailing arm 12 may have a thickness of 8 mm, whereas sections 10, 20 are formed with a wall thickness of about 10 mm.

As a comparison of FIGS. 2 and 3 immediately illustrates, the upper shell element, identical to the lower shell element 4, is initially formed by forming, whereby a base of the lower shell element 4, marked with reference numeral 28 in FIG. 2, has been cut out to form a central insertion opening 30 provided on the upper shell element 6. The central insertion opening 30 provides access to a receptacle 29 within the hollow body 26.

This insertion opening 30 lies in a plane that includes the axis line 46 and the parting plane between the two joined shell elements 4, 6. The axis line 46 thereby passes concentrically through the axle journal 16 as well as the axle journal connection section 20 and the axle body section 10. The axle line 46 forms the axis of rotation of a wheel carrier marked with reference sign 48, which is rotationally supported on the axle journal 16 via roller bearings. This wheel carrier 48 is connected to a drive shaft 50 which, in FIG. 5, couples the wheel carrier 48 to a gearbox 52 which is mounted on the output side of an electric motor 54. The electric motor 54 and the gearbox 52 are connected and realized as a structural unit. This structural unit 58, 54 is bolted, with the interposition of a damping element 56, against the lower shell element 4, specifically the bracket 14 thereof.

The relatively large insertion opening 30 permits the insertion of relatively large components 52, 54 of the electric drive. It is also possible to remove these components 52, 54 for maintenance or repair purposes without having to remove the entire axle of the trailer. The components 52, 54 of the electric drive are received within the receptacle 29.

Figure 5:
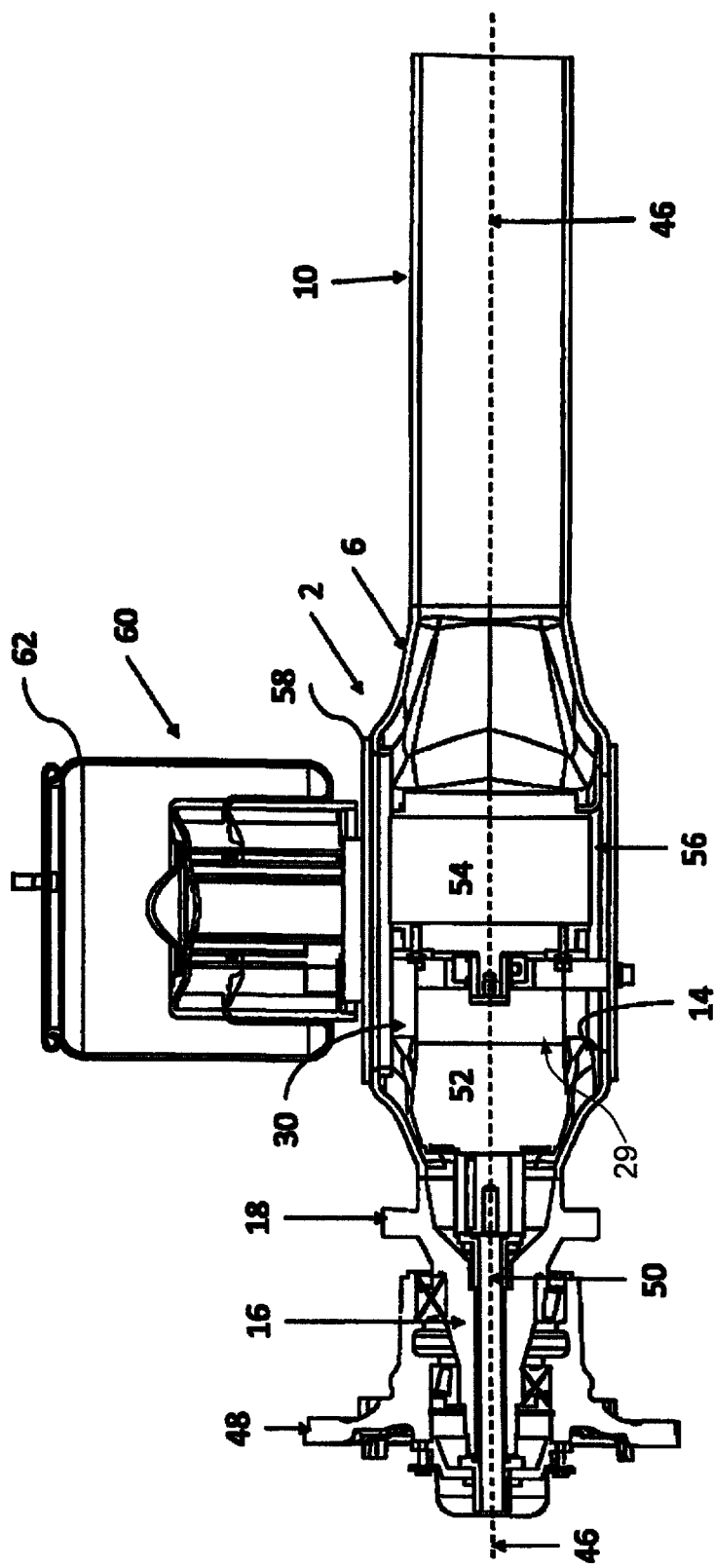

FIG. 5 illustrates with reference sign 58 an air spring carrier which covers the insertion opening 30 and is usually subsequently detachably connected to the upper shell element 6 and, for example, screwed to the upper shell element 6 as a plate-shaped air spring carrier 58. The air spring carrier 58 carries an air spring 60, which has an air spring bellows 62 in a manner known per se, which supports the axle beam 2 in relation to the actual trailer in a manner known per se.

LIST OF REFERENCE NUMERALS 2 axle beam
4 lower shell element
6 upper shell element
8 vehicle rigid axle
10 axle beam section
12 trailing arm
14 bracket
16 axle journal pin
18 brake mounting flange
20 axle journal connection section
22 bearing sleeve
24 joint bearing
26 hollow body
28 base
29 receptacle
30 insertion opening
32 plunger
34 immersion opening
36 indentation
38 fixing hole
40 bearing element
42 legs 44 bearing bore
46 axle line
48 wheel carrier
50 drive shaft
52 gearbox
54 motor
56 damping element
58 air spring carrier
60 air spring
62 air spring bellows

What is claimed is:

1. A vehicle rigid axle comprising:
an axle beam, at the ends of which axle journals or wheel carriers, respectively, are arranged, and with at least two trailing arms rigidly attached to the axle beam and with at least one air spring bellows assigned to a respective trailing arm,
wherein at least one axle beam section extending between the at least two trailing arms and a trailing arm adjoining the at least one axle beam section are formed by two shell elements which are connected to one another and form a hollow body between the two shell elements,
wherein at least one component of an electric drive is provided in the hollow body, a drive shaft of the electric drive passes through the axle journal.

2. The vehicle rigid axle according to claim 1, wherein:
the hollow body has an insertion opening designed to be adapted for insertion of the at least one component of the electric drive in a direction essentially at right angles to the axial extent of the drive shaft.

3. The vehicle rigid axle according to claim 1, wherein:
the at least one component of the electric drive is connected to at least one of the two shell elements.

4. The vehicle rigid axle according to claim 3, wherein:
the at least one component of the electric drive is connected to the at least one of the two shell elements by being screwed from the outside.

5. The vehicle rigid axle according to claim 3, wherein:
the at least one component of the electric drive bears against the at least one of the two shell elements with the interposition of a mechanical damping element.

6. The vehicle rigid axle according to claim 1, wherein:
at least one of the two shell elements has an air spring carrier for supporting the at least one air spring bellows.

7. Method for producing a vehicle rigid axle with an axle beam, at the ends of which axle journals or wheel carriers, respectively, are arranged, and with at least two trailing arms rigidly attached to the axle beam and with at least one bracket assigned to the respective trailing arm for supporting an air spring bellows,
in order to form at least one axle journal connection section extending between the two trailing arms, a trailing arm connected thereto and a receptacle for at least one component of an electric drive, two shell elements made of sheet metal are formed and connected to one another in order to form a hollow body surrounding the receptacle and at least one component of an electric drive is mounted in the receptacle.

8. The method according to claim 7, wherein:
the two shell elements are firstly shaped as identical components and that, to form an upper shell element, a section of the component comprising the at least one bracket is cut off.

9. The method according to claim 7, wherein:
at least one of the shell elements is formed from a sheet metal of varying thickness.

10. The method according to claim 8, wherein:
at least one of the shell elements is formed from a sheet metal of varying thickness.

11. The method according to claim 7, wherein:
the two shell elements are connected by welding.

12. A vehicle rigid axle comprising:
an axle beam;
an axle journal attached to one end of said axle beam, said axle journal configured to hold a wheel carrier;
two shell elements connected to each other forming an axle beam section, a trailing arm, and a hollow body, the hollow body formed between said axle journal and the axle beam section;
a central insertion opening formed in the hollow body;
at least one component of an electric drive provided in the hollow body; and
a drive shaft coupled to the electric drive.

13. The vehicle rigid axle as recited in claim 12 wherein:
said drive shaft passes through said axle journal.

14. The vehicle rigid axle as recited in claim 12 wherein:
Said tow shell elements are connected by a weld.

* * * * *